US012580473B2

(12) United States Patent
Hsieh et al.

(10) Patent No.: US 12,580,473 B2
(45) Date of Patent: Mar. 17, 2026

(54) PLAYBACK CIRCUIT, RECORDING CIRCUIT AND AUDIO CHIP

(71) Applicant: Realtek Semiconductor Corporation, Hsinchu (TW)

(72) Inventors: Fu-Yi Hsieh, Hsinchu (TW); Li-Lung Kao, Hsinchu (TW); Chih Kang Chien, Hsinchu (TW); Chia-Chi Tsai, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 187 days.

(21) Appl. No.: 18/412,587

(22) Filed: Jan. 14, 2024

(65) Prior Publication Data

US 2024/0266940 A1 Aug. 8, 2024

(30) Foreign Application Priority Data

Feb. 7, 2023 (TW) ................................. 112104329

(51) Int. Cl.
*H04S 7/00* (2006.01)
*H02M 1/00* (2006.01)
(Continued)

(52) U.S. Cl.
CPC ......... *H02M 1/0083* (2021.05); *H02M 7/066* (2013.01); *H02M 7/46* (2013.01); *H04S 7/30* (2013.01); *H04S 2400/15* (2013.01)

(58) Field of Classification Search
CPC ........ H03F 3/2175; H03F 3/183; H03F 3/187; H03F 3/181; H03F 2200/03;
(Continued)

(56) References Cited

U.S. PATENT DOCUMENTS 6,259,957 B1 * 7/2001 Alexander .............. G10L 19/18
704/E19.041
10,637,421 B2 * 4/2020 Chang ...................... H03G 3/02
(Continued)

FOREIGN PATENT DOCUMENTS

TW 201113693 A 4/2011
TW 201602774 A 1/2016
TW 202213952 A 4/2022

*Primary Examiner* — Crystal L Hammond
*Assistant Examiner* — Nusrat Quddus
(74) *Attorney, Agent, or Firm* — CKC & Partners Co., LLC

(57) ABSTRACT

A playback circuit including a digital-to-analog converter (DAC), an amplifying output circuit and a control circuit coupled to both is provided. The DAC is configured to convert an input playback audio signal into an input analog playback audio signal according to a first control signal for controlling an upper limit of power consumption of the DAC. The amplifying output circuit is coupled to the DAC and configured to generate an output playback audio signal according to the input analog playback audio signal and a second control signal for controlling an upper limit of power consumption of the amplifying output circuit. The control circuit is configured to generate the first control signal and second control signal according to a volume value of the input playback audio signal, thereby controlling the upper limit of power consumption of the DAC and the upper limit of power consumption of the amplifying output circuit.

20 Claims, 6 Drawing Sheets

(51) Int. Cl.
    *H02M 7/06*        (2006.01)
    *H02M 7/46*        (2006.01)
(58) Field of Classification Search
    CPC .... H03F 2200/129; H03F 1/3264; H03F 1/32;
              H03F 1/3247; H03M 1/00; H03M 1/18;
              H03M 1/181; H03M 1/70; H03M 1/51;
              H03M 3/51; H04R 3/00; H04R 2499/11;
              H04R 2430/01; H03G 3/3089; H03G
              3/3005; H03G 3/001; H03G 3/301; H03G
                      3/32; H04M 1/0202
    USPC .................................................. 381/120, 121
    See application file for complete search history.

(56)                References Cited

U.S. PATENT DOCUMENTS 10,855,277 B1 *  12/2020  Yadav ............ H03K 19/018585
11,804,814 B1 *  10/2023  Stilgenbauer ............ H03G 3/34
2004/0107407 A1 *  6/2004  Henson ..................... G06F 1/26
                                      716/103
2008/0130916 A1 *  6/2008  Kong ................... H03G 3/3026
                                      381/104
2009/0091390 A1 *  4/2009  Hossack ............... H03G 3/001
                                      330/285
2011/0016739 A1 *  1/2011  Beck ...................... F26B 15/18
                                    198/689.1
2011/0075861 A1 *  3/2011  Wu ........................ H03G 7/007
                                    381/107
2012/0121106 A1 *  5/2012  Henriksen ............... H04R 3/06
                                    381/94.1
2013/0120060 A1 *  5/2013  Loeda .................. H03G 1/0088
                                    330/86
2017/0064455 A1 *  3/2017  Asao ...................... H04R 5/033
2018/0351523 A1 *  12/2018  Lesso ................... H03G 3/3089
2020/0366261 A1 *  11/2020  Kao ........................ H03F 3/183
2022/0166387 A1 *  5/2022  Peng ........................ H03F 1/26

* cited by examiner

PLAYBACK CIRCUIT, RECORDING CIRCUIT AND AUDIO CHIP

RELATED APPLICATIONS

This application claims priority to Taiwan application Serial Number 112104329, filed on Feb. 7, 2023, which is herein incorporated by reference in its entirety.

BACKGROUND

Technical Field

The present disclosure relates to an audio processing system. More particularly, the present disclosure relates to a playback circuit, a recording circuit and an audio chip.

Description of Related Art

With the development of film and television technology and the popularization of film and television entertainment, audio devices (e.g., stereo systems, speakers, microphones, etc.) have been integrated into modern life, and the performance and power consumption of audio devices are often the reference conditions for the public when choosing audio device products.

However, the performance and power consumption of audio devices are often closely related. Saving the power consumption of an audio device requires reducing its power, but at the cost of its performance. On the contrary, enhancing the performance of an audio device requires increasing its power, and the power consumption will also increase accordingly. Therefore, how to adjust the upper limit of the power consumption of circuits in the audio device according to the intensity (e.g., amplitude) of the input audio signal automatically or manually by the user's instruction is one of the issues in this field.

SUMMARY

The disclosure provides a playback circuit, comprising a digital-to-analog converter (DAC), an amplifying output circuit and a control circuit. The DAC is configured to convert an input playback audio signal into an input analog playback audio signal according to a first control signal, wherein the first control signal is configured to control an upper limit of power consumption of the DAC. The amplifying output circuit is coupled to the DAC and configured to generate an output playback audio signal according to a second control signal and the input analog playback audio signal, wherein the second control signal is configured to control the an upper limit of power consumption of the amplifying output circuit. The control circuit is coupled to the DAC and the amplifying output circuit, and configured to generate the first control signal and the second control signal according to a volume value of the input playback audio signal, so as to control the upper limit of power consumption of the DAC and the upper limit of power consumption of the amplifying output circuit.

The disclosure provides a recording circuit, comprising a recording gain circuit, an analog-to-digital converter (ADC) and a control circuit. The recording gain circuit comprises a sub-recording gain circuit, wherein the sub-recording gain circuit is configured to control an upper limit of power consumption of the sub-recording gain circuit according a first control signal, and configured to amplify an input recording audio signal into a first amplified input recording audio signal. The ADC is coupled to the recording gain circuit and configured to generate an output recording audio signal according to a second control signal and the first amplified input recording audio signal, wherein the second control signal is configured to control an upper limit of power consumption of the ADC. The control circuit is coupled to the recording gain circuit and the ADC, and configured to generate the first control signal and the second control signal according to a volume value of the output recording audio signal, so as to control the upper limit of power consumption of the recording gain circuit and the upper limit of power consumption of the ADC.

The disclosure provides an audio chip, comprising a playback circuit and a recording circuit. The playback circuit comprises a digital-to-analog converter (DAC), an amplifying output circuit and a control circuit. The DAC is configured to convert an input playback audio signal into an input analog playback audio signal according to a first control signal, wherein the first control signal is configured to control an upper limit of power consumption of the DAC. The amplifying output circuit is coupled to the DAC and configured to generate an output playback audio signal according to a second control signal and the input analog playback audio signal, wherein the second control signal is configured to control the an upper limit of power consumption of the amplifying output circuit. The recording circuit comprises a recording gain circuit, an analog-to-digital converter (ADC) and the control circuit. The recording gain circuit comprises a sub-recording gain circuit, wherein the sub-recording gain circuit is configured to control an upper limit of power consumption of the sub-recording gain circuit according a third control signal, and configured to amplify an input recording audio signal into a first amplified input recording audio signal. The ADC is coupled to the recording gain circuit and configured to generate an output recording audio signal according to a fourth control signal and the first amplified input recording audio signal, wherein the fourth control signal is configured to control an upper limit of power consumption of the ADC. The control circuit is coupled to the DAC, the amplifying output circuit, the recording gain circuit and the ADC, configured to generate the first control signal and the second control signal according to a volume value of the input playback audio signal, and configured to generate the third control signal and the fourth control signal according to a volume value of the output recording audio signal, so as to control the upper limits of power consumption of the DAC, the amplifying output circuit, the recording gain circuit and the ADC.

With the playback circuit, recording circuit and audio chip of the present disclosure, the mode that the circuit runs in can be controlled according to the intensity (e.g., amplitude) of the input analog audio signal, the volume value carried by the digital audio signal or the user's instruction, so as to adjust the upper limit of the power consumption of circuits in the audio device automatically or manually.

It is to be understood that both the foregoing general description and the following detailed description are by examples, and are intended to provide further explanation of the disclosure as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
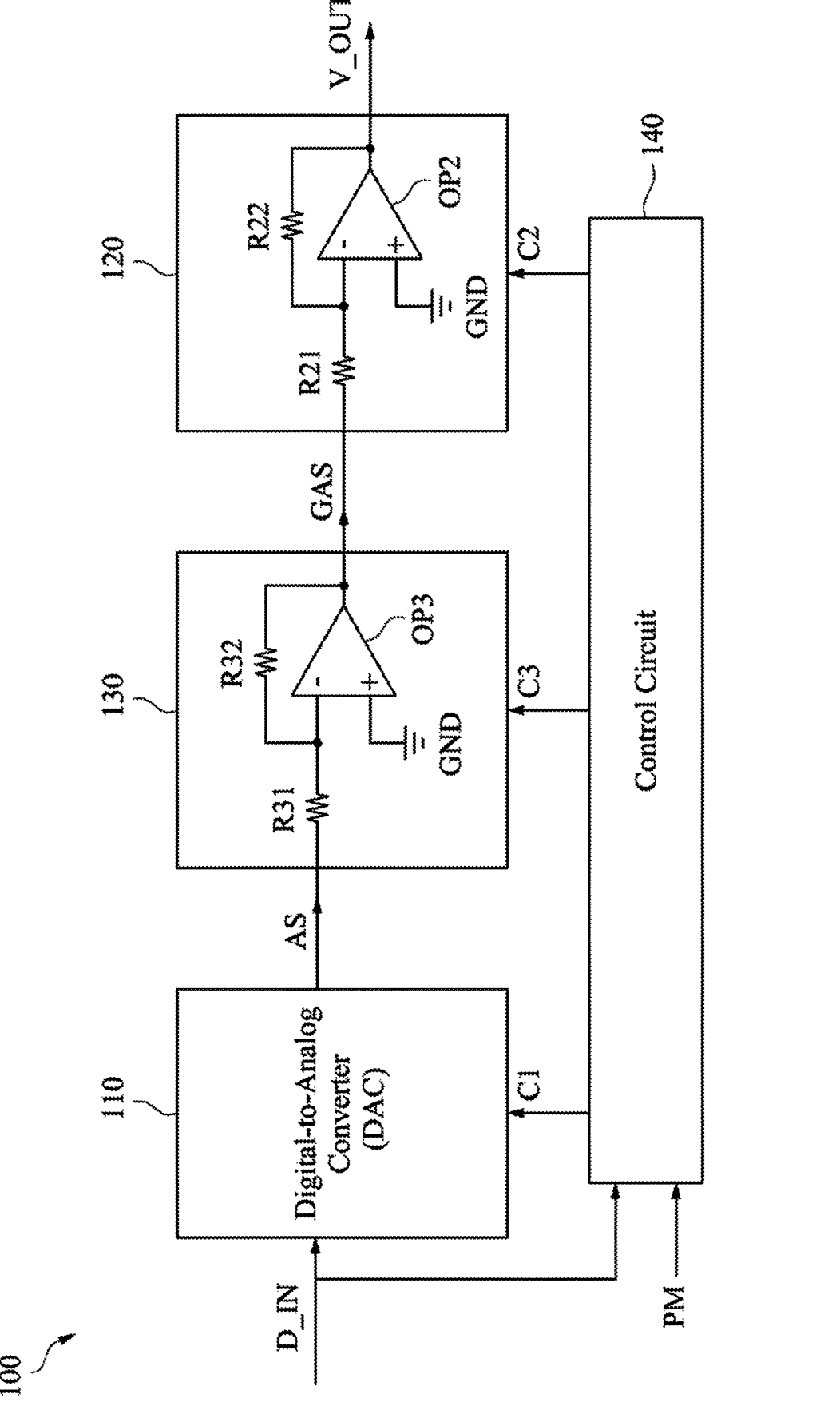
FIG. 1 is a simplified block diagram of a playback circuit in accordance with some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

The term "coupled" or "connected" used throughout the present disclosure may refer to two or more elements physically or electrically contact with each other in direct, or physically or electrically contact with each other in indirect, or two or more elements interact or act on each other. Although terms such as "first", "second", etc. are used in the present disclosure to describe different elements, these terms are only used to distinguish elements or operations described by the same technical terms. Unless clearly indicated, the terms do not specifically refer to or imply a sequence or an order, nor are they intended to limit the present disclosure.

FIG. 1 is a simplified block diagram of a playback circuit 100 in accordance with some embodiments of the present disclosure. In some embodiments, the playback circuit 100 comprises a digital-to-analog converter (DAC) 110, an amplifying output circuit 120, a playback gain circuit 130 and a control circuit 140. The playback circuit 100 is used to amplify an input playback audio signal D_IN, so as to generate an output playback audio signal V_OUT for driving a power amplifier for speakers or headphones (not shown in FIG. 1).

The DAC 110 is coupled to the playback gain circuit 130 and the control circuit 140, and used to convert the input playback audio signal D_IN into an input analog playback audio signal AS according to a control signal C1. In some embodiments, the DAC 110 has different upper limits of power consumption, and the control signal C1 is used to control the DAC 110 to select one of the upper limits of power consumption.

Figure 2A:
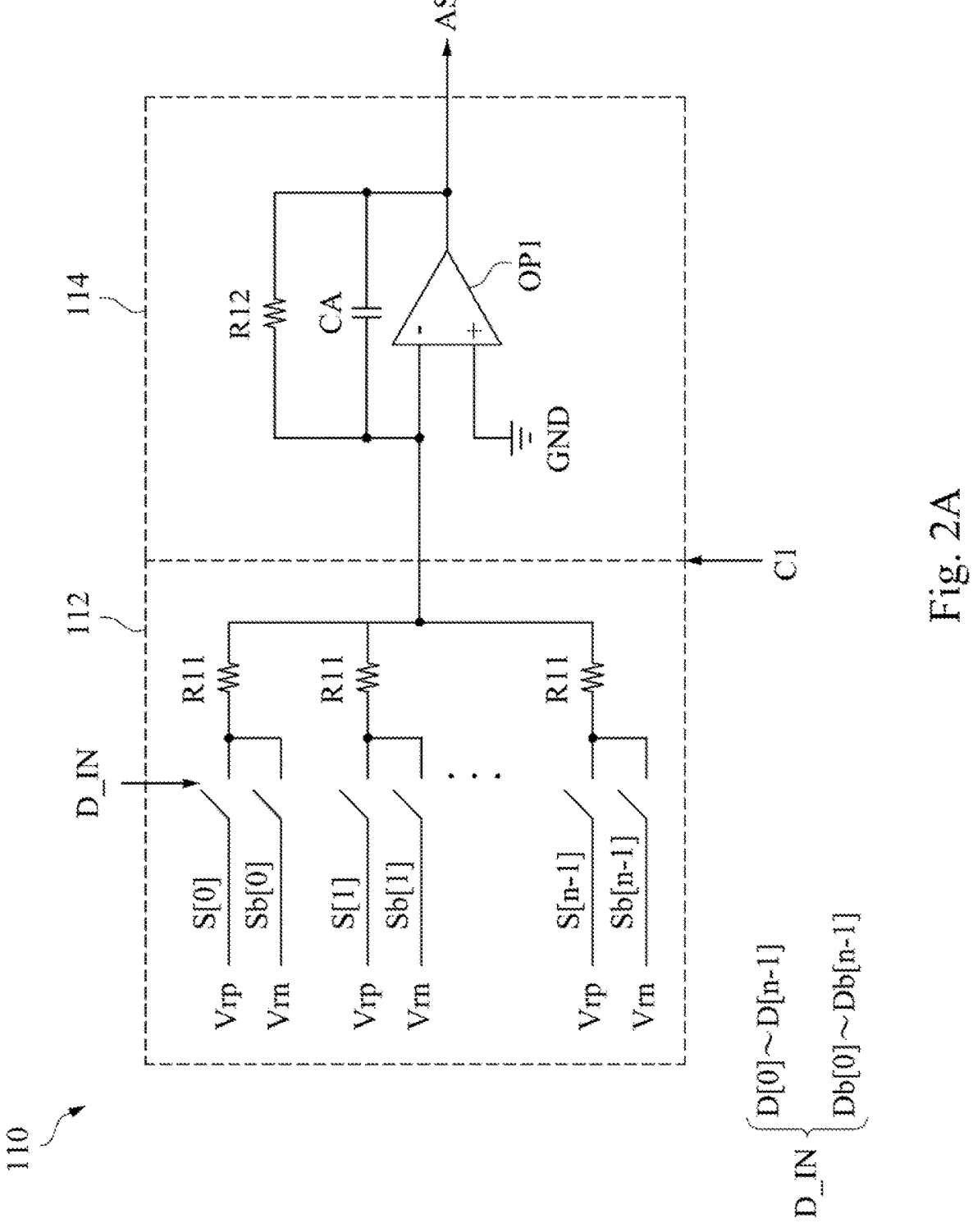
FIG. 2A is a circuit diagram of a digital-to-analog converter in accordance with some embodiments of the present disclosure.

Please refer to FIG. 2A for the configuration and operation of the DAC 110. FIG. 2A is a circuit diagram of the DAC 110 in accordance with some embodiments of the present disclosure. In some embodiments, the DAC 110 comprises a switch array 112 and an amplifying stage 114 coupled to each other. The switch array 112 is used to receive the input playback audio signal D_IN, and control a reference voltage signal received by an inverting input terminal of the amplifying stage 114 according to the input playback audio signal D_IN. The amplifying stage 114 is used to output the input analog playback audio signal AS according to the control signal C1 and the received reference voltage signal.

In some embodiments, the switch array 112 comprises switches S[0]-S[n-1], switches Sb[0]-Sb[n-1] and n resistors R11, wherein n is a positive integer. One end of each of the switches S[0]-S[n-1] is coupled to the reference voltage Vrp, and the other end of each of the switches S[0]-S[n-1] is respectively coupled to a first end of each of the n resistors R11; one end of each of the switches Sb[0]-Sb[n-1] is coupled to the reference voltage Vrn, and the other end of each of the switches Sb[0]-Sb[n-1] is respectively coupled to the first end of each of the n resistors R11, wherein second terminals of all the resistors R11 are coupled to the inverting input terminal of the amplifying stage 114. The switch S[0] and the switch Sb[0] are coupled to the same resistor R11, the switch S[1] and the switch Sb[1] are coupled to the same resistor R11, and so on.

The input playback audio signal D_IN comprises sub-input playback audio signals D[0]-D[n-1] and Db[0]-Db[n-1], wherein the sub-input playback audio signals D[0]-D[n-1] are respectively inverse to the sub-input playback audio signals Db[0]-Db[n-1]. Operationally, the sub-input playback audio signals D[0]-D[n-1] are used to control the switches S[0]-S[n-1] respectively, and the sub-input playback audio signals Db[0]-Db[n-1] are used to control the switches Sb[0]-Sb[n-1] respectively. In other words, according to the input playback audio signal D_IN received by the switch array 112, one of the switches S[0] and Sb[0] is turned on, and the other is turned off, so as to transmit the reference voltage Vrp or Vrn; one of the switches S[1] and Sb[1] is turned on, and the other is turned off, so as to transmit the reference voltage Vrp or Vrn, and so on.

In some embodiments, the amplifying stage 114 comprises a resistor R12, a capacitor CA and an amplifier OP1, wherein the resistor R12 and the capacitor CA are coupled in parallel between an inverting input terminal of the amplifier OP1 and an output terminal of the amplifier OP1. A non-inverting input terminal of the amplifier OP1 is coupled to a ground voltage GND or an AC ground voltage.

In some embodiments, the resistance values of the resistors R11 and R12 are fixed. In another embodiment, the resistors R11 and R12 can be implemented with switched-capacitor circuits.

In some embodiments, the amplifier OP1 can be implemented by connecting a plurality of operational amplifiers in parallel and in cascade. The forms of cascading comprise but are not limited to folded-cascode, differential-pair active load and telescopic cascode.

Figure 2B:
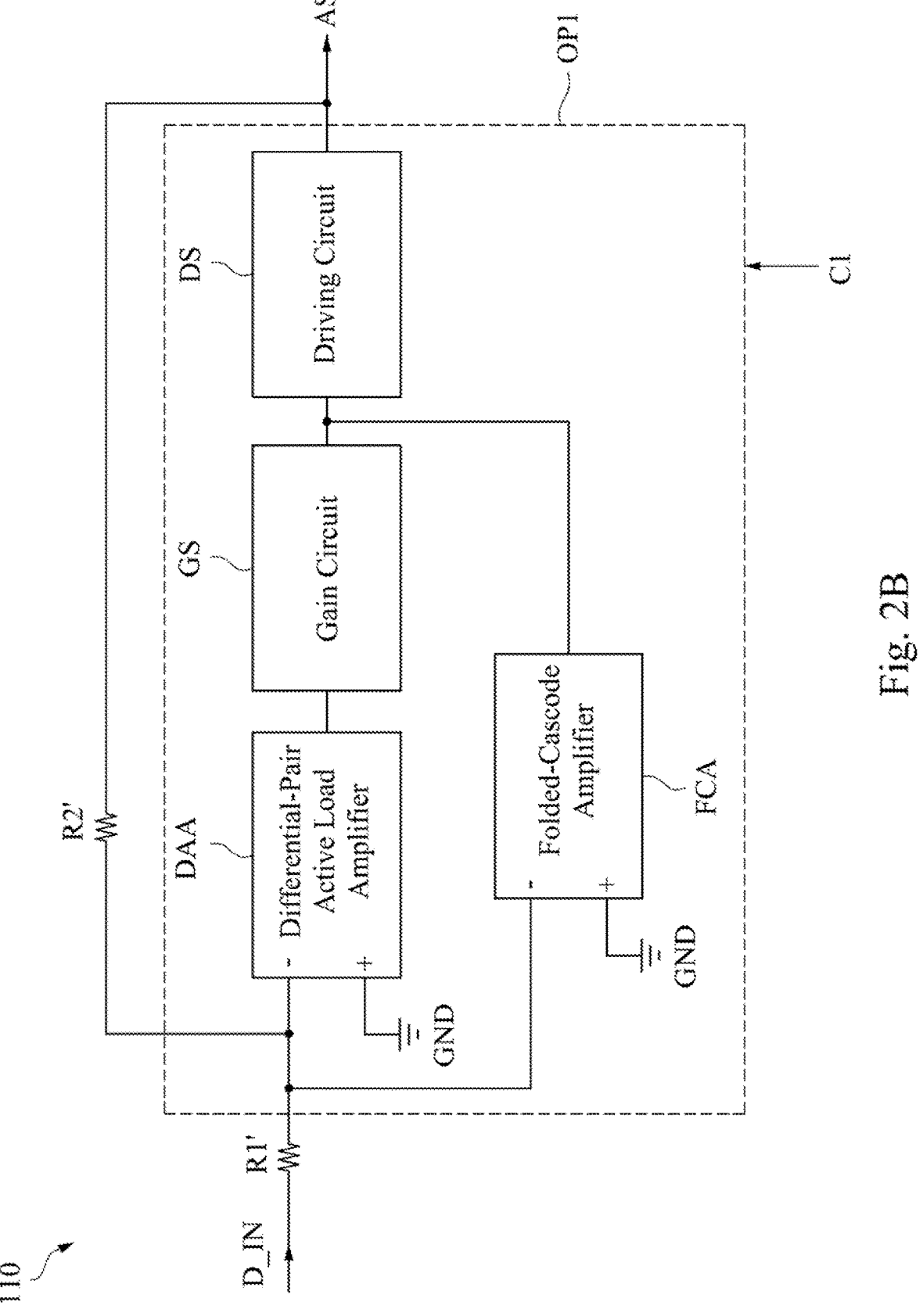
FIG. 2B is a partial circuit diagram of a digital-to-analog converter in accordance with some embodiments of the present disclosure.

In order to clearly illustrate the way to implement the amplifier OP1, please further refer to FIG. 2B. FIG. 2B is a partial circuit diagram of the DAC 110 in accordance with some embodiments of the present disclosure, wherein an impedance component R1' represents the n resistors R11 in FIG. 2A, and an impedance component R2' represents the resistor R12 and the capacitor CA connected in parallel in FIG. 2A. In the embodiment of FIG. 2B, the amplifier OP1 comprises a folded-cascode amplifier FCA, a differential-pair active load amplifier DAA, a gain circuit GS and a driving circuit DS, wherein the differential-pair active load amplifier DAA is coupled to the gain circuit GS in series, the folded-cascode amplifier FCA is coupled to the differential-pair active load amplifier DAA and the gain circuit GS in parallel, and the driving circuit DS is coupled to the folded-cascode amplifier FCA and the gain circuit GS.

In some embodiments, the folded-cascode amplifier FCA, the differential-pair active load amplifier DAA and the gain circuit GS are all amplifier circuits with one stage. Operationally, the amplifier OP1 is used to disable or enable the folded-cascode amplifier FCA, the differential-pair active load amplifier DAA and the gain circuit GS according to the received control signal C1, and then determine the number of stages of the amplifier OP1. Consequently, the amplifier OP1 may have different circuit structures and thus has different upper limits of power consumption.

For example, when the amplifier OP1 enables the folded-cascode amplifier FCA, and disables the differential-pair active load amplifier DAA and the gain circuit GS, according to the control signal C1, the number of stages of the amplifier OP1 will be reduced to one stage, so that the upper limit of power consumption of the amplifier OP1 will be reduced. On the other hand, when the amplifier OP1 disables the folded-cascode amplifier FCA, and enables the differential-pair active load amplifier DAA and the gain circuit GS, according to the control signal C1, the number of stages of the amplifier OP1 will be increased to two stages, so that the upper limit of power consumption of the amplifier OP1 will be increased.

In some embodiments, the control signal C1 is used to control the bias current of the amplifier OP1 of the DAC 110, the operating voltage (i.e., a power supply rail) of the amplifier OP1 of the DAC 110, the circuit structure of the DAC 110 or any combination thereof, so that the DAC 110 may operate under different upper limits of power consumption.

For example, if the DAC 110 is expected to operate in a power-saving mode (i.e., the upper limit of power consumption is lower), the bias current, the operating voltage or the number of stages of the amplifier OP1 may be reduced through the control signal C1. If the DAC 110 is expected to operate in a high-performance mode (i.e., the upper limit of power consumption is higher), the bias current, the operating voltage or the number of stages of the amplifier OP1 may be increased through the control signal C1.

Please refer to FIG. 1 again. In the embodiment of FIG. 1, the amplifying output circuit 120 is coupled to the playback gain circuit 130 and the control circuit 140, and used to generate the output playback audio signal V_OUT according to a control signal C2 and an amplified input analog playback audio signal GAS. In some embodiments, the amplifying output circuit 120 comprises variable resistors R21, R22 and an amplifier OP2.

In some embodiments, a first terminal of the variable resistor R21 is coupled to the playback gain circuit 130 and used to receive the amplified input analog playback audio signal GAS, and a second terminal of the variable resistor R21 is coupled to a first terminal of the variable resistor R22 and an inverting input terminal of the amplifier OP2, a second terminal of the variable resistor R22 is coupled to an output terminal of the amplifier OP2, and a non-inverting input terminal of the amplifier OP2 is coupled to the ground voltage GND or an AC ground voltage. In other words, the amplifying output circuit 120 may be implemented with an inverting amplifier, and the resistance of the variable resistors R21 and R22 may determine the gain of the amplifying output circuit 120.

The amplifier OP2 can be implemented in the way similar to that of the amplifier OP1 in FIG. 2B (i.e., by connecting a plurality of operational amplifiers in parallel and in cascade). For the sake of brevity, detailed descriptions are omitted.

In some embodiments, the amplifying output circuit 120 has different upper limits of power consumption, and the control signal C2 is used to control the amplifying output circuit 120 to select one of the upper limits of power consumption. In some embodiments, the control signal C2 is used to control the bias current, the operating voltage of the amplifier OP2 of the amplifying output circuit 120, the resistance of the variable resistors R21 and R22, the circuit structure of the amplifying output circuit 120 or any combination thereof, so that the amplifying output circuit 120 may operate under different upper limits of power consumption.

Please refer to FIG. 1 again. In the embodiment of FIG. 1, the playback gain circuit 130 is coupled between the DAC 110 and the amplifying output circuit 120, coupled to the control circuit 140, and used to convert the input analog playback audio signal AS into the amplified input analog playback audio signal GAS according to the control signal C3. In some embodiments, the playback gain circuit 130 comprises variable resistors R31, R32 and an amplifier OP3.

The resistance of the variable resistors R31 and R32 may determine the gain of the playback gain circuit 130. The amplifier OP3 can be implemented in the way similar to that of the amplifier OP1 in FIG. 2B (i.e., by connecting a plurality of operational amplifiers in parallel and in cascade). For the sake of brevity, detailed descriptions are omitted.

In some embodiments, the playback gain circuit 130 has different upper limits of power consumption, and the control signal C3 is used to control the playback gain circuit 130 to select one of the upper limits of power consumption. The way that the control signal C3 controls the playback gain circuit 130 is similar to the way that the control signal C2 controls the amplifying output circuit 120. For the sake of brevity, detailed descriptions are omitted. In some embodiments, the output power of the amplifying output circuit 120 is not necessarily the same as but could be greater or less than the output power of the playback gain circuit 130.

Please refer to FIG. 1 again. In the embodiment of FIG. 1, the control circuit 140 is coupled to the DAC 110, the amplifying output circuit 120 and the playback gain circuit 130, used to receive the input playback audio signal D_IN and a playback mode signal PM, and used to generate the control signals C1-C3 according to the input playback audio signal D_IN and the playback mode signal PM, so as to control the upper limits of power consumption of the DAC 110, the amplifying output circuit 120 and the playback gain circuit 130.

It is worth noting that when the playback mode signal PM corresponds to the power-saving mode or the high-performance mode, the control circuit 140 may only use the playback mode signal PM to generate the control signals C1-C3, and may ignore the volume value carried by the input playback audio signal D_IN. In other words, the playback mode signal PM at this time determines the upper limits of power consumption of the DAC 110, the amplifying output circuit 120 and the playback gain circuit 130. On the other hand, when the playing mode signal PM corresponds to a waiting mode (or a standby mode), the control circuit 140 may only use the input playback audio signal D_IN to generate the control signals C1-C3, that is, the volume value carried by the input playback audio signal D_IN determines the upper limits of power consumption of the DAC 110, the amplifying output circuit 120 and the playback gain circuit 130.

For example, when the playback mode signal PM corresponds to the power-saving mode, the control circuit 140 may ignore the volume value carried by the input playback audio signal D_IN and generate corresponding control signals C1-C3 according to the playback mode signal PM, so as to reduce the upper limits of power consumption of the DAC 110, the amplifying output circuit 120 and the playback gain circuit 130; when the playback mode signal PM corresponds to the high-performance mode, the control circuit 140 may ignore the volume value carried by the input playback audio signal D_IN and generate corresponding control signals C1-C3 according to the playback mode signal PM, so as to increase the upper limits of power consumption of the DAC 110, the amplifying output circuit 120 and the playback gain circuit 130; when the playback mode signal PM corresponds to the waiting mode, the control circuit 140 may generate corresponding control signals C1-C3 according to the volume value carried by the input playback audio signal D_IN, so as to adjust the upper limits of power consumption of the DAC 110, the amplifying output circuit 120 and the playback gain circuit 130.

Through the aforementioned way that the control signals C1-C3 control the DAC 110, the amplifying output circuit 120 and the playback gain circuit 130, the upper limit of power consumption of the playback circuit 100 can be adjusted manually (i.e., according to the playback mode signal PM) or automatically (i.e., according to the input playback audio signal D_IN).

In some embodiments, the playback gain circuit 130 in the playback circuit 100 can be omitted. At this time, the amplifying output circuit 120 will be directly coupled to the DAC 110 and the control circuit 140, and used to generate the output playback audio signal V_OUT according to the input analog playback audio signal AS and the control signal C2.

Figure 3:
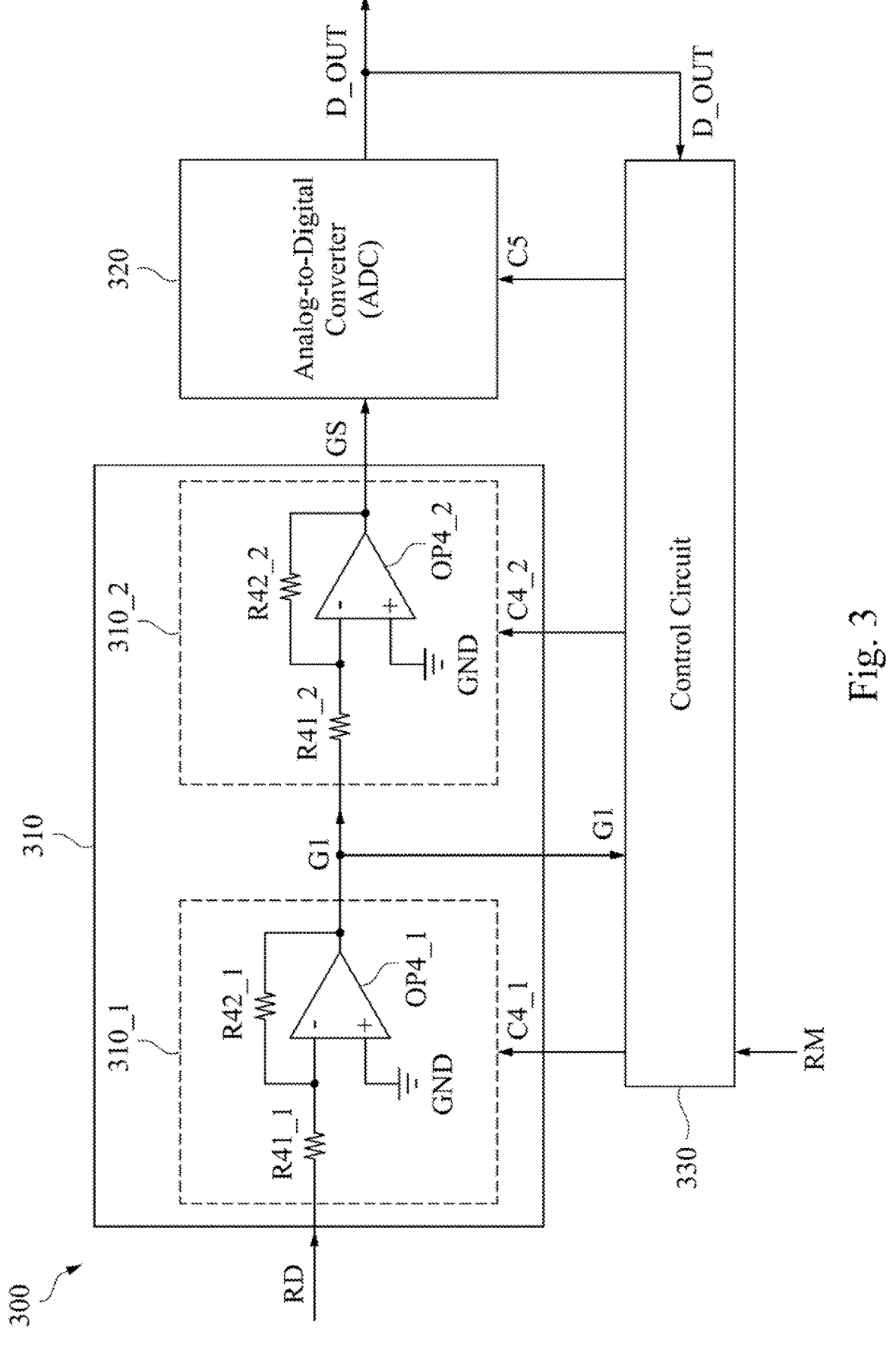
FIG. 3 is a simplified block diagram of a recording circuit in accordance with some embodiments of the present disclosure.

FIG. 3 is a simplified block diagram of a recording circuit 300 in accordance with some embodiments of the present disclosure. In some embodiments, the recording circuit 300 comprises a recording gain circuit 310, an analog-to-digital converter (ADC) 320 and a control circuit 330, wherein the recording gain circuit 310 comprises sub-recording gain circuits 310_1 and 310_2. The recording circuit 300 is used to adjust the intensity (e.g., the amplitude) of an input recording audio signal RD, and convert the adjusted input recording audio signal RD into an output recording audio signal D_OUT stored in a storage device (not shown in FIG. 3) in digital format.

In some embodiments, the sub-recording gain circuit 310_1 is coupled to the sub-recording gain circuit 310_2 and the control circuit 330, used to amplify the input recording audio signal RD into an amplified input recording audio signal G1 according to a control signal C4_1, and used to transfer the amplified input recording audio signal G1 to the sub-recording gain circuit 310_2 and the control circuit 330. The sub-recording gain circuit 310_2 is coupled to the sub-recording gain circuit 310_1 and the control circuit 330, and used to amplify the amplified input recording audio signal G1 into an amplified input recording audio signal GS according to the control signal C4_2.

In some embodiments, each of the sub-recording gain circuits 310_1 and 310_2 comprises m variable resistors and an amplifier, where m is a positive integer. As shown in FIG. 3, the sub-recording gain circuit 310_1 comprises variable resistors R41_1, R42_1 and an amplifier OP4_1, and the sub-recording gain circuit 310_2 comprises variable resistors R41_2, R42_2 and an amplifier OP4_2.

The configuration of the sub-recording gain circuits 310_1 and 310_2 can be similar to the configuration of the amplifying output circuit 120 of FIG. 1, that is, the variable resistors R41_1, R42_1 and the amplifier OP4_1 are combined as an inverting amplifier, and the variable resistors R41_2, R42_2 and the amplifier OP4_2 are combined as an inverting amplifier. In other words, the resistance of the variable resistors R41_1 and R42_1 can determine the gain of the sub-recording gain circuit 310_1, and the resistance of the variable resistors R41_2 and R42_2 can determine the gain of the sub-recording gain circuit 310_2. The amplifiers OP4_1 and OP4_2 can be implemented in the way similar to that of the amplifier OP1 (i.e., by connecting a plurality of operational amplifiers in parallel and in cascade). For the sake of brevity, detailed descriptions are omitted.

In some embodiments, each of the sub-recording gain circuits 310_1 and 310_2 has different upper limits of power consumption, and the control signals C4_1 and C4_2 are respectively used to control the sub-recording gain circuits 310_1 and 310_2 to select one of the upper limits of power consumption. The way that the control signals C4_1 and C4_2 respectively control the sub-recording gain circuits 310_1 and 310_2 is similar to the way that the control signal C2 controls the amplifying output circuit 120. For the sake of brevity, detailed descriptions are omitted.

The ADC 320 is coupled to the recording gain circuit 310 and the control circuit 330, and used to convert the amplified input recording audio signal GS into the output recording audio signal D_OUT according to a control signal C5.

Figure 4:
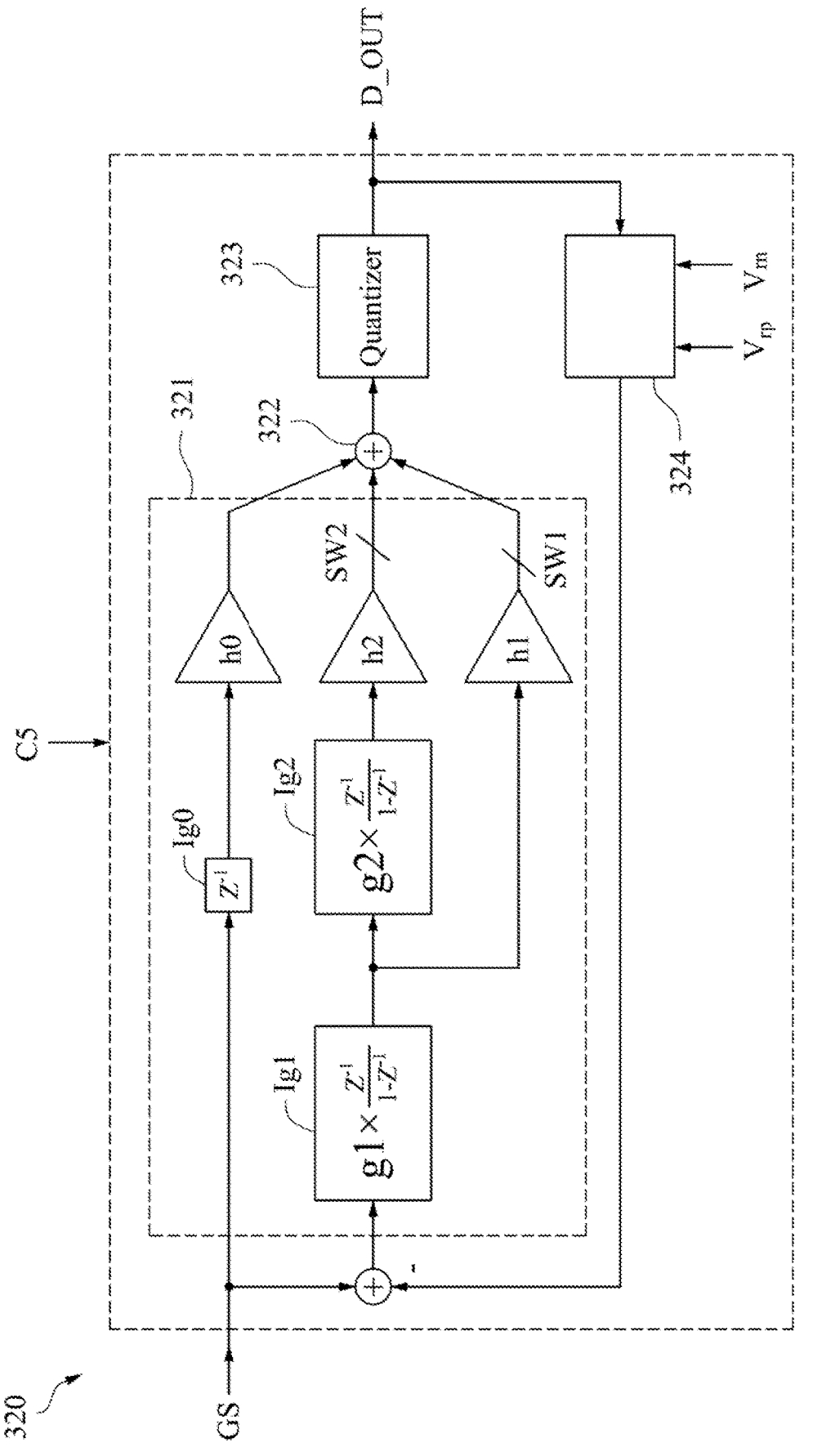
FIG. 4 is a simplified block diagram of an analog-to-digital converter in accordance with some embodiments of the present disclosure.

FIG. 4 is a simplified block diagram of the ADC 320 in accordance with some embodiments of the present disclosure. In the embodiment of FIG. 4, the ADC 320 comprises an integrating stage 321, an adder 322, a quantizer 323 and a feedback circuit 324. The integrating stage 321 comprises a unit buffer Ig0, integrators Ig1-Ig2 in multiple stages, weighting units h0-h2 and switches SW1-SW2. The integrators Ig1-Ig2 in multiple stages are used to integrate the amplified input recording audio signal GS output by the recording gain circuit 310 and the output of the feedback circuit 324. The amplified input recording audio signal GS output by the recording gain circuit 310 may also pass through the unit buffer Ig0. The adder 322 is used to weight the amplified input recording audio signal GS output by the recording gain circuit 310 and the integration results of the integrators Ig1-Ig2 in each stage, with specific weight values provided by the weighting units h0-h2, and then sum them up. The quantizer 323 is used to generate the output recording audio signal D_OUT with different orders and bit numbers according to the output of the adder 322 and the control signal C5. The feedback circuit 324 is used to feed back the output recording audio signal D_OUT to the integrating stage 321. In some embodiments, the feedback circuit 324 can be implemented with a DAC, and the feedback circuit 324 is coupled to the reference voltage Vrp and Vrn.

Operationally, the ADC 320 is used to adjust the gains of the integrators Ig1-Ig2 (labeled with "g1" and "g2" in FIG. 4), the gains of the weighting units h0-h2, enabling and disabling of the switches SW1-SW2, and the bit number of the output signal of the quantizer 323, according to the received control signal C5, so that the ADC 320 may have different circuit structures and thus operates under different upper limits of power consumption.

For example, when the control signal C5 instructs the recording circuit 300 to operate in the power-saving mode, the ADC 320 will turn off the switch SW2 and set the bit number of the output signal of the quantizer 323 to 1, so that the output signal of the ADC 320 is a $1^{st}$-order and 1-bit signal, thereby reducing the upper limit of power consumption of the ADC 320; when the control signal C5 instructs the recording circuit 300 to operate in a high-performance mode, the ADC 320 will turn on the switches SW1-SW2 and set the bit number of the output signal of the quantizer 323 to 3, so that the output signal of the ADC 320 is a $2^{nd}$-order and 3-bit signal, thereby increasing the upper limit of power consumption of the ADC 320.

In some embodiments, the control signal C5 is used to control the circuit structure, the bias current, the operating voltage of the ADC 320 or any combination thereof, so that the ADC 320 can operate under different upper limits of power consumption.

For example, if the ADC 320 is expected to operate in the power-saving mode (i.e., the upper limit of power consumption is lower), the bias current, the operating voltage, the order of the output signal, the bit number of the output signal of the ADC 320 (i.e., the circuit structure of the ADC 320) or any combination thereof may be reduced through the control signal C5. If the ADC 320 is expected to operate in the high-performance mode (i.e., the upper limit of power consumption is higher), the bias current, the operating voltage, the order of the output signal, the bit number of the output signal of the ADC 320 or any combination thereof may be increased through the control signal C5.

Please refer to FIG. 3 again. The control circuit 330 is coupled to the sub-recording gain circuits 310_1, 310_2 (i.e., all circuits in the recording gain circuit 310) and the ADC 320, used to receive the amplified input recording audio signal G1 and a recording mode signal RM, and generate the control signals C4_1, C4_2 and C5 according to the amplified input recording audio signal G1 and the recording mode signal RM, so as to control the upper limits of power consumption of the recording gain circuit 310 and the ADC 320. In some embodiments, the control circuit 330 is further used to receive the output recording audio signal D_OUT, and generate the control signals C4_1, C4_2 and C5 according to the output recording audio signal D_OUT, the amplified input recording audio signal G1 and the recording mode signal RM.

It is worth noting that transmitting the amplified input recording audio signal G1 to the control circuit 330 can help the control circuit 330 to determine the gain of the input recording audio signal RD after passing through the sub-recording gain circuit 310_1, so as to determine the generated control signals C4_1, C4_2 and C5. Similarly, transmitting the output recording audio signal D_OUT to the control circuit 330 can also help the control circuit 330 to determine the gain of the input recording audio signal RD after passing through the recording gain circuit 310 and the ADC 320, so as to determine the generated control signals C4_1, C4_2 and C5. In addition, by receiving both the output recording audio signal D_OUT and the amplified input recording audio signal G1, the misjudgment caused by the noise and glitch in the gain process of the control circuit 330 can be reduced. In some embodiments, the control circuit 330 replaces the amplified input recording audio signal G1 with the amplified input recording audio signal GS as the basis for generating the control signals C4_1, C4_2 and C5.

Operationally, the control circuit 330 may determine whether to use the recording mode signal RM or use the output recording audio signal D_OUT and the amplified input recording audio signal G1 to generate the corresponding control signals C4_1, C4_2 and C5, according to the recording mode signal RM corresponding to the power-saving mode, high-performance mode or waiting mode, so as to manually or automatically control the upper limits of power consumption of the recording gain circuit 310 and the ADC 320.

For example, when the recording mode signal RM corresponds to the power-saving mode, the control circuit 330 may ignore the volume value carried by the output recording audio signal D_OUT and the intensity (e.g., the amplitude) of the amplified input recording audio signal G1, and generate corresponding control signals C4_1, C4_2 and C5 according to the recording mode signal RM, so as to reduce the upper limits of power consumption of the recording gain circuit 310 and the ADC 320; when the recording mode signal RM corresponds to the high-performance mode, the control circuit 330 may ignore the volume value carried by the output recording audio signal D_OUT and the intensity (e.g., the amplitude) of the amplified input recording audio signal G1, and generate corresponding control signals C4_1, C4_2 and C5 according to the recording mode signal RM, so as to increase the upper limits of power consumption of the recording gain circuit 310 and the ADC 320; when the recording mode signal RM corresponds to the waiting mode, the control circuit 330 may generate corresponding control signals C4_1, C4_2 and C5 according to the volume value carried by the output recording audio signal D_OUT and the intensity (e.g., the amplitude) of the amplified input recording audio signal G1, so as to adjust the upper limits of power consumption of the recording gain circuit 310 and the ADC 320.

It should be noted that the numbers of sub-recording gain circuits, control signals, and the numbers of integrators, weighting units and switches in the ADC 320 in the present disclosure are only examples, and are not intended to limit the present disclosure. Other numbers of sub-recording gain circuits, control signals, and other numbers of integrators, weighting units and switches in ADC 320 are within the scope of the present disclosure.

Figure 5:
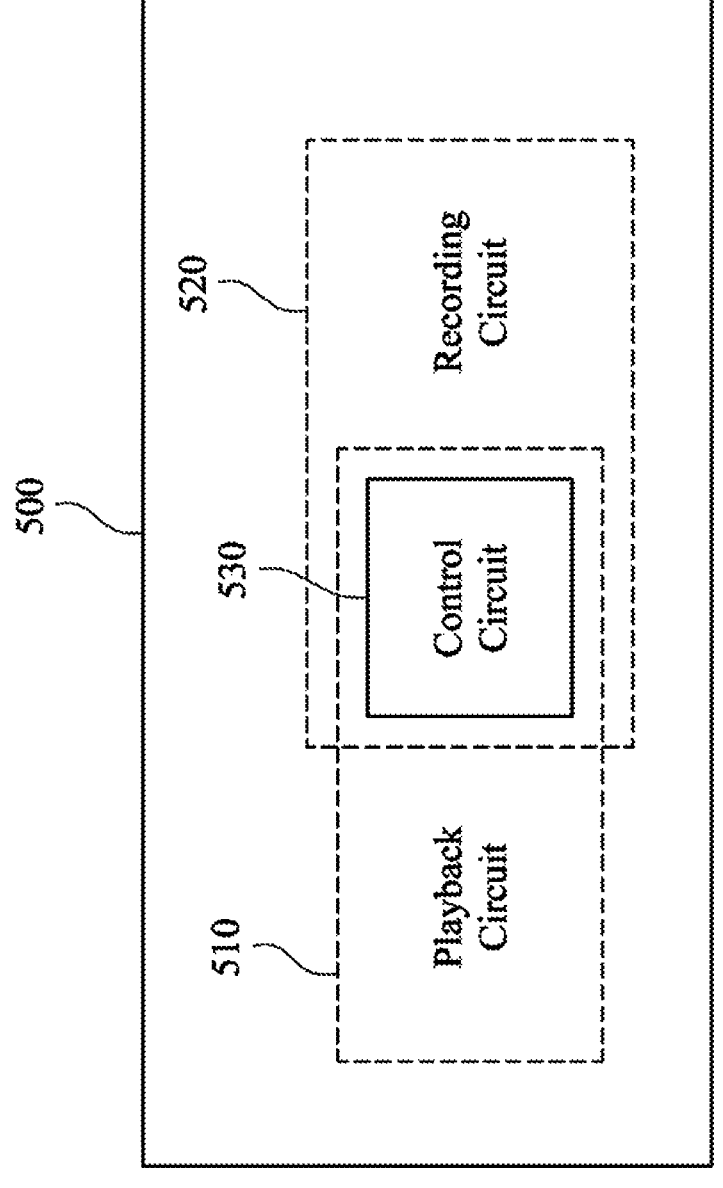
FIG. 5 is a simplified block diagram of an audio chip in accordance with some embodiments of the present disclosure.

FIG. 5 is a simplified block diagram of an audio chip 500 in accordance with some embodiments of the present disclosure. The audio chip 500 comprises a playback circuit 510 and a recording circuit 520, and both the playback circuit 510 and the recording circuit 520 comprise a control circuit 530. The playback circuit 510 is similar to the playback circuit 100 in FIG. 1, except that the control circuit 530 is different from the control circuit 140 in FIG. 1. The recording circuit 520 is similar to the recording circuit 300 in FIG. 3, except that the control circuit 530 is different from the control circuit 330 in FIG. 3. In some embodiments, the control circuit 530 has the functions of both the control circuit 140 and the control circuit 330. In some embodiments, the connection relationship between the control circuit 530 and the other components in the playback circuit 510 is similar to the connection relationship between the control circuit 140 and the other components in the playback circuit 100 in FIG. 1. In some embodiments, the connection relationship between the control circuit 530 and the other components in the recording circuit 520 is similar to the connection relationship between the control circuit 330 and the other components in the recording circuit 300 in FIG. 3.

With the playback circuit 100, the recording circuit 300 and the audio chip 500 of the present disclosure, the upper limits of power consumption of the audio device can be adjusted manually (e.g., according to the mode set by the user) or automatically (e.g., according to the volume values carried by the input playback audio signal or the output recording audio signal), so as to keep the performance of the audio device stable.

The above are preferred embodiments of the present disclosure, and various modifications and equivalent changes may be made to the structure of the present disclosure without departing from the scope or spirit of the present disclosure. In view of the foregoing, it is intended that the present disclosure cover modifications and variations of this invention provided they fall within the scope of the following claims.

11

What is claimed is:

1. A playback circuit, comprising:
a digital-to-analog converter (DAC), configured to convert an input playback audio signal into an input analog playback audio signal according to a first control signal, wherein the first control signal is configured to control an upper limit of power consumption of the DAC;
an amplifying output circuit, coupled to the DAC and configured to generate an output playback audio signal according to a second control signal and the input analog playback audio signal, wherein the second control signal is configured to control the an upper limit of power consumption of the amplifying output circuit;
a control circuit, coupled to the DAC and the amplifying output circuit, and configured to generate the first control signal and the second control signal according to a volume value of the input playback audio signal, so as to control the upper limit of power consumption of the DAC and the upper limit of power consumption of the amplifying output circuit; and
a playback gain circuit, coupled between the DAC and the amplifying output circuit and coupled to the control circuit, comprising a plurality of variable resistors and an amplifier, and configured to convert the input analog playback audio signal into an amplified input analog playback audio signal according to a third control signal.

2. The playback circuit of claim 1, wherein the first control signal is configured to control a bias current of an amplifier of the DAC, an operating voltage of the amplifier of the DAC, a circuit structure of the DAC or any combination thereof.

3. The playback circuit of claim 1, wherein the second control signal is configured to control a bias current of an amplifier of the amplifying output circuit, an operating voltage of the amplifier of the amplifying output circuit, resistances of a plurality of variable resistors of the amplifying output circuit, a circuit structure of the amplifying output circuit or any combination thereof.

4. The playback circuit of claim 1,
wherein the control circuit is further configured to generate the third control signal according to the volume value of the input playback audio signal, so as to control an upper limit of power consumption of the playback gain circuit, and
wherein the amplifying output circuit is further configured to convert the input analog playback audio signal into the output playback audio signal.

5. The playback circuit of claim 4, wherein the third control signal is configured to control a bias current of the amplifier of the playback gain circuit, an operating voltage of the amplifier of the playback gain circuit, resistances of the plurality of variable resistors of the playback gain circuit, a circuit structure of the playback gain circuit or any combination thereof.

6. The playback circuit of claim 4, wherein each of the DAC, the amplifying output circuit and the playback gain circuit has a plurality of different upper limits of power consumption.

7. The playback circuit of claim 4, wherein the control circuit is further configured to receive a playback mode signal, and the playback mode signal is configured to instruct the playback circuit to operate in a power-saving mode, a high-performance mode or a waiting mode,
when the playback circuit operates in the power-saving mode, the control circuit is configured to reduce the upper limits of power consumption of the DAC, the playback gain circuit and the amplifying output circuit according to the playback mode signal,
when the playback circuit operates in the high-performance mode, the control circuit is configured to increase the upper limits of power consumption of the DAC, the playback gain circuit and the amplifying output circuit according to the playback mode signal, and
when the playback circuit operates in the waiting mode, the control circuit is configured to adjust the upper limits of power consumption of the DAC, the playback gain circuit and the amplifying output circuit according to the volume value of the input playback audio signal.

8. A recording circuit, comprising:
a recording gain circuit, comprising a sub-recording gain circuit, wherein the sub-recording gain circuit is configured to control an upper limit of power consumption of the sub-recording gain circuit according a first control signal, and configured to amplify an input recording audio signal into a first amplified input recording audio signal;
an analog-to-digital converter (ADC), coupled to the recording gain circuit and configured to generate an output recording audio signal according to a second control signal and the first amplified input recording audio signal, wherein the second control signal is configured to control an upper limit of power consumption of the ADC; and
a control circuit, coupled to the recording gain circuit and the ADC, and configured to generate the first control signal and the second control signal according to a volume value of the output recording audio signal, so as to control the upper limit of power consumption of the recording gain circuit and the upper limit of power consumption of the ADC,
wherein the control circuit is further configured to receive a recording mode signal, and the recording mode signal is configured to instruct the recording circuit to operate in a waiting mode, when the recording circuit operates in the waiting mode, the control circuit is configured to adjust the upper limits of power consumption of the sub-recording gain circuit and the ADC according to the first amplified input recording audio signal and the volume value of the output recording audio signal.

9. The recording circuit of claim 8, wherein the first control signal is configured to control a bias current of an amplifier of the sub-recording gain circuit, an operating voltage of the amplifier of the sub-recording gain circuit, resistances of a plurality of variable resistors of the sub-recording gain circuit, a circuit structure of the sub-recording gain circuit or any combination thereof.

10. The recording circuit of claim 8, wherein the second control signal is configured to control a bias current of the ADC, an operating voltage of the ADC, a circuit structure of the ADC or any combination thereof.

11. The recording circuit of claim 8, wherein each of the sub-recording gain circuit and the ADC has a plurality of different upper limits of power consumption.

12. The recording circuit of claim 8, wherein the recording mode signal is configured to instruct the recording circuit to operate in a power-saving mode, a high-performance mode or the waiting mode,
when the recording circuit operates in the power-saving mode, the control circuit is configured to reduce the upper limits of power consumption of the sub-recording gain circuit and the ADC according to the recording mode signal, and when the recording circuit operates in the high-performance mode, the control circuit is configured to increase the upper limits of power consumption of the sub-recording gain circuit and the ADC according to the recording mode signal.

13. An audio chip, comprising:

a playback circuit, comprising:

a digital-to-analog converter (DAC), configured to convert an input playback audio signal into an input analog playback audio signal according to a first control signal, wherein the first control signal is configured to control an upper limit of power consumption of the DAC;

an amplifying output circuit, coupled to the DAC and configured to generate an output playback audio signal according to a second control signal and the input analog playback audio signal, wherein the second control signal is configured to control the an upper limit of power consumption of the amplifying output circuit;

a control circuit, coupled to the DAC and the amplifying output circuit, and configured to generate the first control signal and the second control signal according to a volume value of the input playback audio signal, so as to control the upper limit of power consumption of the DAC and the upper limit of power consumption of the amplifying output circuit; and a playback gain circuit, coupled between the DAC and the amplifying output circuit and coupled to the control circuit, comprising a plurality of variable resistors and an amplifier, and configured to convert the input analog playback audio signal into an amplified input analog playback audio signal according to a fifth control signal; and a recording circuit, comprising:

a recording gain circuit, comprising a sub-recording gain circuit, wherein the sub-recording gain circuit is configured to control an upper limit of power consumption of the sub-recording gain circuit according a third control signal, and configured to amplify an input recording audio signal into a first amplified input recording audio signal;

an analog-to-digital converter (ADC), coupled to the recording gain circuit and configured to generate an output recording audio signal according to a fourth control signal and the first amplified input recording audio signal, wherein the fourth control signal is configured to control an upper limit of power consumption of the ADC; and the control circuit, further coupled to the recording gain circuit and the ADC, and further configured to generate the third control signal and the fourth control signal according to a volume value of the output recording audio signal, so as to control the upper limit of power consumption of the recording gain circuit and the upper limit of power consumption of the ADC.

14. The audio chip of claim 13, wherein the first control signal is configured to control a bias current of an amplifier of the DAC, an operating voltage of the amplifier of the DAC, a circuit structure of the DAC or any combination thereof, and wherein the second control signal is configured to control a bias current of an amplifier of the amplifying output circuit, an operating voltage of the amplifier of the amplifying output circuit, resistances of a plurality of variable resistors of the amplifying output circuit, a circuit structure of the amplifying output circuit or any combination thereof.

15. The audio chip of claim 13, wherein the third control signal is configured to control a bias current of an amplifier of the sub-recording gain circuit, an operating voltage of the amplifier of the sub-recording gain circuit, resistances of a plurality of variable resistors of the sub-recording gain circuit, a circuit structure of the sub-recording gain circuit or any combination thereof.

16. The audio chip of claim 13, wherein the fourth control signal is configured to control a bias current of the ADC, an operating voltage of the ADC, a circuit structure of the ADC or any combination thereof.

17. The audio chip of claim 13, wherein the control circuit is further configured to generate the fifth control signal according to the volume value of the input playback audio signal, so as to control an upper limit of power consumption of the playback gain circuit, and wherein the amplifying output circuit is further configured to convert the input analog playback audio signal into the output playback audio signal.

18. The audio chip of claim 17, wherein the fifth control signal is configured to control a bias current of the amplifier of the playback gain circuit, an operating voltage of the amplifier of the playback gain circuit, resistances of the plurality of variable resistors of the playback gain circuit, a circuit structure of the playback gain circuit or any combination thereof.

19. The audio chip of claim 17, wherein each of the DAC, the amplifying output circuit, the playback gain circuit, the sub-recording gain circuit and the ADC has a plurality of different upper limits of power consumption.

20. The audio chip of claim 17, wherein the control circuit is further configured to receive a mode signal, and the mode signal is configured to instruct the playback circuit and the recording circuit to operate in a power-saving mode, a high-performance mode or a waiting mode, when the playback circuit and the recording circuit operate in the power-saving mode, the control circuit is configured to reduce the upper limits of power consumption of the DAC, the playback gain circuit, the amplifying output circuit, the sub-recording gain circuit and the ADC according to the mode signal, when the playback circuit and the recording circuit operate in the high-performance mode, the control circuit is configured to increase the upper limits of power consumption of the DAC, the playback gain circuit, the amplifying output circuit, the sub-recording gain circuit and the ADC according to the mode signal, and when the playback circuit and the recording circuit operate in the waiting mode, the control circuit is configured to adjust the upper limits of power consumption of the DAC, the playback gain circuit and the amplifying output circuit according to the volume value of the input playback audio signal, and adjust the upper limits of power consumption of the sub-recording gain circuit and the ADC according to the first amplified input recording audio signal and the volume value of the output recording audio signal.

\* \* \* \* \*